(12) United States Patent
Wang et al.

(10) Patent No.: US 9,431,045 B1
(45) Date of Patent: Aug. 30, 2016

(54) MAGNETIC SEED LAYER USED WITH AN UNBALANCED SOFT UNDERLAYER

(71) Applicant: WD Media, LLC, San Jose, CA (US)

(72) Inventors: Zhenguo Wang, Singapore (SG); Iwao Okamoto, Singapore (SG); Sy Vu, San Jose, CA (US); Daehoon Hong, Fremont, CA (US)

(73) Assignee: WD MEDIA, LLC, San Jose, CA (US)

( * ) Notice: Subject to any disclaimer, the term of this patent is extended or adjusted under 35 U.S.C. 154(b) by 0 days.

(21) Appl. No.: 14/695,463

(22) Filed: Apr. 24, 2015

Related U.S. Application Data
(60) Provisional application No. 61/984,615, filed on Apr. 25, 2014.

(51) Int. Cl.
| | | |
|---|---|---|
| *G11B 5/82* | (2006.01) | |
| *G11B 5/667* | (2006.01) | |
| *G11B 5/738* | (2006.01) | |
| *G11B 5/84* | (2006.01) | |

(52) U.S. Cl.
CPC ............ *G11B 5/667* (2013.01); *G11B 5/738* (2013.01); *G11B 5/84* (2013.01)

(58) Field of Classification Search
CPC ......... G11B 5/732; G11B 5/667; G11B 5/66; G11B 5/7325; G11B 5/851; G11B 5/65; G11B 5/82
USPC .......................................................... 360/135
See application file for complete search history.

(56) References Cited

U.S. PATENT DOCUMENTS

| | | |
|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |

(Continued)

FOREIGN PATENT DOCUMENTS

JP 5126674 B2 * 1/2013 ............ G11B 5/656

*Primary Examiner* — Will J Klimowicz

(74) *Attorney, Agent, or Firm* — Convergent Law Group LLP

(57) ABSTRACT

A magnetic media is described including a substrate, an unbalanced soft under layer (SUL), a magnetic seed layer, which may consist of one or more of NiWxCoy, NiWxCoy-Alz, NiVaCob, NiVaCobAlc, NiWxVaCob, and NiWxVaFeb, and a magnetic recording layer.

19 Claims, 6 Drawing Sheets

(56) References Cited

U.S. PATENT DOCUMENTS

| | | |
|---|---|---|
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,632,580 B2 | 12/2009 | Ikeda et al. |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,767 B2 | 6/2010 | Bian et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,824,785 B2 | 11/2010 | Inamura et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |

(56) References Cited

U.S. PATENT DOCUMENTS

| | | |
|---|---|---|
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,507,115 B2 | 8/2013 | Arai et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'Im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0305080 A1* | 12/2009 | Li .................... G11B 5/667 |
| | | 428/828 |
| 2009/0311557 A1 | 12/2009 | Onoue et al. |
| 2010/0021766 A1* | 1/2010 | Inamura ............ G11B 5/732 |
| | | 428/800 |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0043939 A1 | 2/2011 | Nolan et al. |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0127609 A1 | 5/2012 | Chang et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0293225 A1 | 11/2013 | Singleton et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

(56) References Cited

U.S. PATENT DOCUMENTS

| | | |
|---|---|---|
| 2014/0151360 A1 | 6/2014 | Gregory et al. |
| 2014/0234666 A1 | 8/2014 | Knigge et al. |
| 2015/0162041 A1* | 6/2015 | Iwasaki .................. G11B 5/66 360/110 |

* cited by examiner

MAGNETIC SEED LAYER USED WITH AN UNBALANCED SOFT UNDERLAYER

CROSS-REFERENCE TO RELATED APPLICATION

This application claims the benefit of U.S. Provisional Application Ser. No. 61/984,615, entitled "MAGNETIC SEED LAYER HAVING AN UNBALANCED SOFT UNDERLAYER" and filed on Apr. 25, 2014, which is expressly incorporated by reference herein in its entirety.

BACKGROUND

FIG. 1 is a schematic illustration of a magnetic recording device, such as an HDD 100, according to one embodiment of the present disclosure. The HDD 100 includes at least one magnetic recording medium, such as a disk 102 that is supported on a spindle 104. A motor causes the spindle 104, and hence the disk 102, to rotate. One or more magnetic heads 106 are mounted on a slider 108 and move over the disks 102 to read and write information from and to the disks 102. The heads 106 ride on an air bearing in close proximity to the disks 102 during read and write operations. The slider 108 is coupled to an actuator 110 by a suspension 112. The suspension 112 provides a slight spring force which biases the slider 108 towards the disk surface. Each actuator 110 is attached to an actuator means 114 that controls the movement of the head 106 relative to the disk 102. A HDD ramp 116 is positioned such that when the actuator 110 rotates the slider 108 and head 106 away from the disk 102, the heads and slider can "park" on the HDD ramp 116.

The disk 102 is formed on either a glass or an aluminum alloy substrate depending on the particular design requirements of the device. The disk 102 (also referred to as the media) is configured to be usable at high recording densities, and in some embodiments, to be used in the Perpendicular Magnetic Recording (PMR). The media thus stores data in which the bits of magnetic moment orient in substantially perpendicular direction to the surface of the disk 102.

FIG. 2 depicts a conventional magnetic recording media with a non-magnetic seed layer. As shown in FIG. 2, the magnetic media 102 may generally include some or all of the constituent layers shown in FIG. 2, including a substrate 202, a bottom soft magnetic underlayer (SUL) 204 and a top SUL 208 separated by an AFC coupling layer 206, a non-magnetic seed layer 210, an intermediate layer 212, a magnetic recording layer 214, a cap layer 216 and an overcoat layer 218.

The top SUL layer 208 and the bottom SUL layer 204 are magnetically coupled through the antiferromagnetic coupling layer (AFC) 206. The bottom SUL 204, AFC coupling layer 206 and top SUL 208 are also referred to as the SUL structure 220. The recording layer 214 and the soft under layers 204 and 208 provide a magnetic circuit that allows magnetic flux to travel from the magnetic recording head 106 through the magnetic recording layer 214 and the soft underlayers 204 and 208, back to the magnetic recording head, thus forming a loop. Additionally, the SUL layers 204 & 208 allow for increasing conductance of magnetic flux through the magnetic media 102 and therefore improve writabilty of the magnetic media 102. However, the writabilty of the magnetic media 102 further improves if the distance between the magnetic recording head 106 and the top SUL 208 is as small as possible.

DETAILED DESCRIPTION OF THE PREFERRED EMBODIMENTS

Aspects of the present invention provide magnetic seed layers in a magnetic recording media. Various aspects of the magnetic recording media according to the present invention will now be described.

Figure 1:
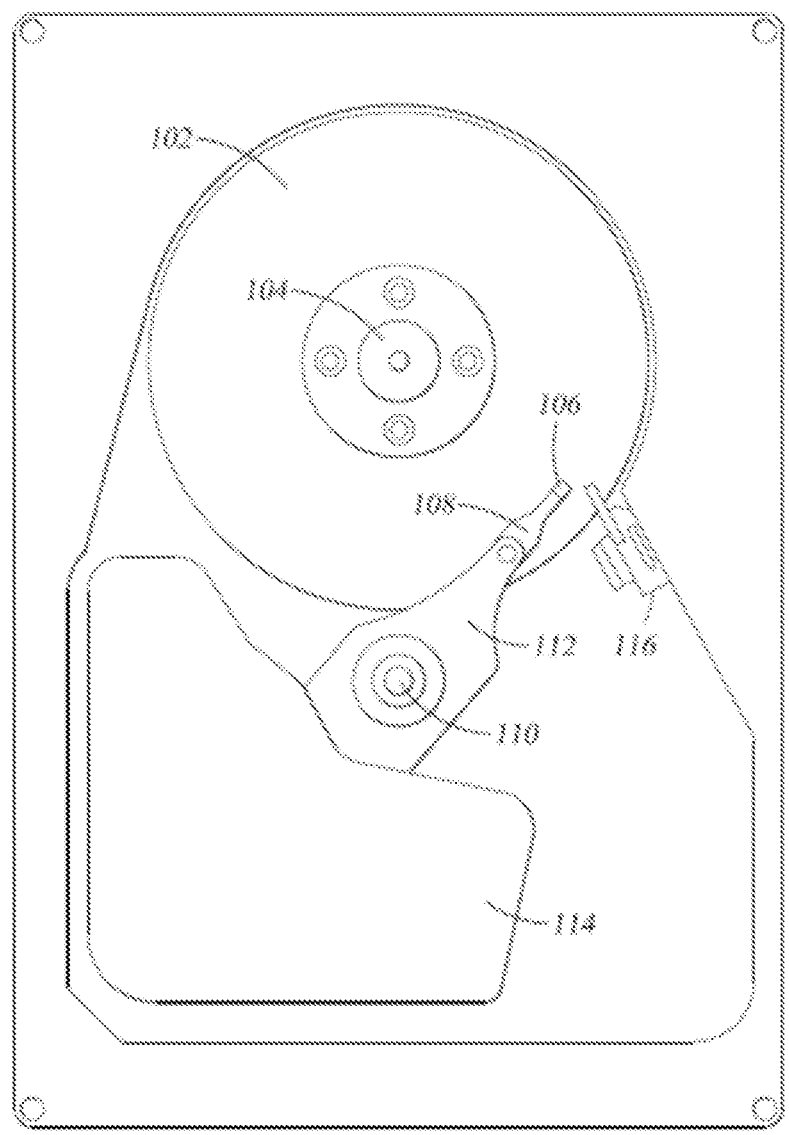
FIG. 1 depicts components of a hard disk drive.
Figure 3:
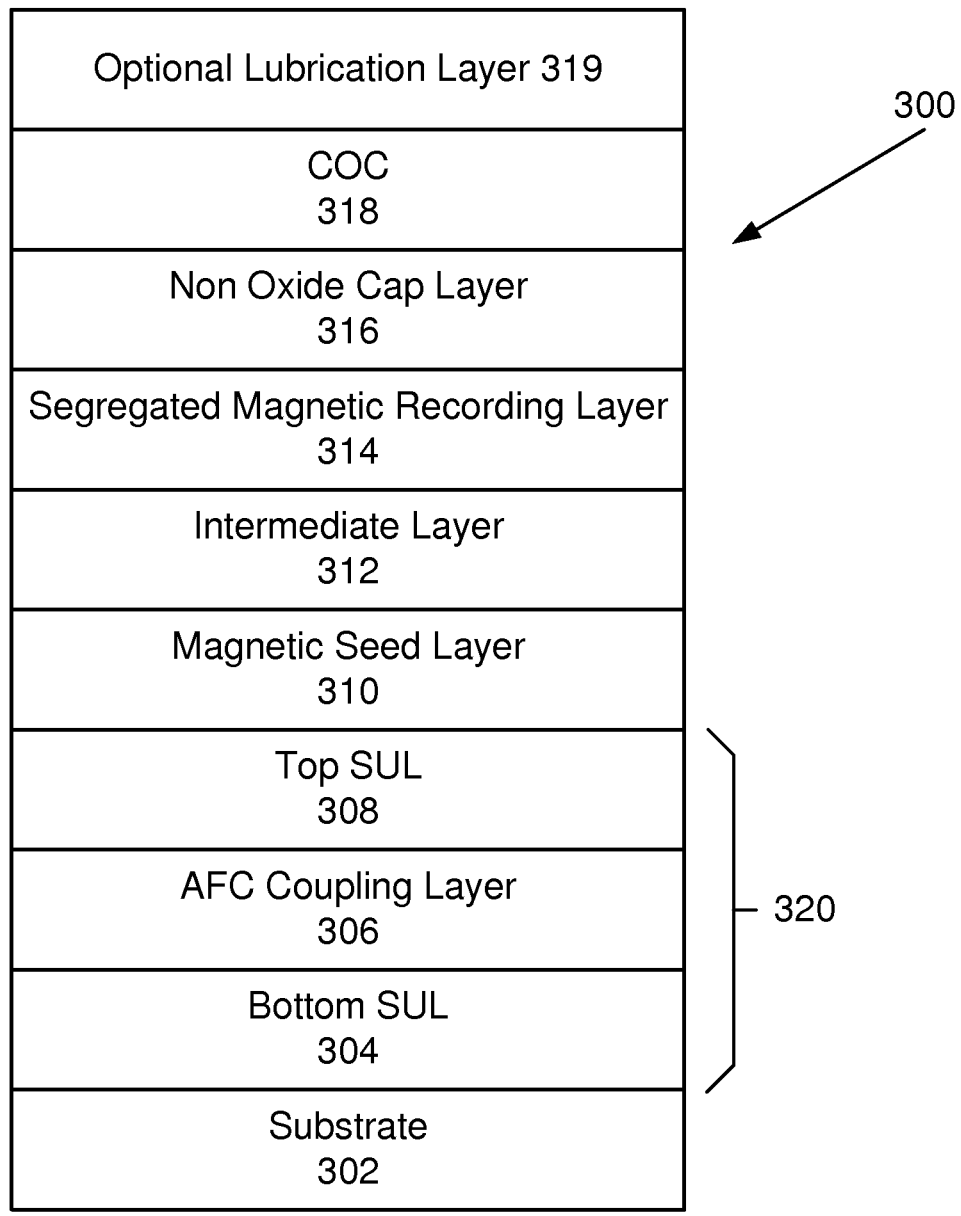
FIG. 3 depicts the structure of a magnetic media with an unbalanced SUL and a magnetic seed layer according to an exemplary embodiment.

FIG. 3 depicts the structure of magnetic media with an unbalanced SUL and a magnetic seed layer according an exemplary embodiment. The magnetic media 300 may be used in the disk drive depicted in FIG. 1. For clarity, figures are not to scale. For simplicity not all portions of the disk drive, recording head and the media are shown. In addition, although the disk drive is depicted in the context of particular components other and/or different components may be used. For example, circuitry used to drive and control various portions of the disk drive is not shown. For simplicity, only single components are shown. However, multiples of each component and/or its sub-component might be used.

A magnetic media 300 according to exemplary embodiments may be formed over a substrate made of aluminum alloy or glass 302. The media 300 may include a bottom SUL layer 304 deposited on the substrate. In exemplary embodiments, a top SUL layer 308 located above the bottom SUL layer 304, and separated by an antiferromagnetic coupling (AFC) layer 306 that couples the bottom 304 and top SUL 308 layers, forming the SUL structure 320. In exemplary embodiments, the bottom SUL 304 thickness may be greater than the thickness of the top SUL 308 layer. In these embodiments, the SUL may be unbalanced with respect to the AFC layer 306, meaning there is more magnetic material located below the AFC layer 306 than above the AFC layer. In some embodiments the AFC 306 layer may be Ruthenium. Stated differently, the thicknesses and/or magnetic moments of the bottom SUL 304 and top SUL 308 layers may not be the same.

In exemplary embodiments, the media 300 may include a magnetic seed layer 310 located on the top SUL 308. The magnetic seed layer 310 may have a thickness of at least three nanometers and not more than seven nanometers. The magnetic seed layer 310 may have a crystalline structure configured to facilitate growth and orientation of the magnetic recording layer 314. For example, the magnetic seed layer 310, along with a nonmagnetic seed layer 312 (also referred to as an intermediate layer), may be used to promote the columnar grain growth along the easy axis, promote the grain size, and provide grain segregation in the magnetic recording layer 314. In some embodiments, the intermediate layer 312 has a thickness of at least six and not more than fifteen nanometers. The magnetic seed layer 310 includes Nickel (Ni) alloyed with a nonmagnetic material and at least one other magnetic material, such as Fe and/or Co. For example, in one exemplary embodiment, Ni is alloyed with Tungsten (W) and/or Vanadium (V) in addition to Iron (Fe), Cobalt (Co) or Aluminum (Al). In some embodiments, the magnetic seed layer 310 may include at least one of $NiW_xFe_y$, $NiW_xCo_y$, and $NiW_xCo_yAl_z$, where x is between three to seven atomic percent, y and z may be between fifteen and to forty atomic percent, and the remainder of the composition consists of Nickel. In alternative embodiments, the magnetic seed layer 310 may include at least, $NiV_aCo_b$, $NiW_xV_aCo_y$, or $NiW_xV_aFe_b$ alloys, where x and a may be at least three atomic percent but not more than seven atomic percent, y and b may be at least fifteen atomic percent and not more than forty atomic percent, c may be between 0.5 and 2 atomic percent, and the remainder of the composition would consist of Nickel. In alternative embodiments of $NiW_xV_aCo_y$, or $NiW_xV_aFe_b$ alloys, the media performance may be optimized by having "x" and "a" equal percent, and/or y and b equal.

In some embodiments, the media 300 may include an intermediate layer 312. As previously stated, the intermediate layer acts as a non-magnetic seed layer above the magnetic seed layer 310, and may help promote the easy axis for the columnar grain growth as well as the grain size of the magnetic layer 314.

A magnetic recording layer 314 (or magnetic layer) 314 includes magnetic bits that are used by the magnetic recording head to store data on the magnetic media. The recording layer has high coercivity to provide more magnetic and thermal stability for the recorded bits. In some embodiments, the magnetic recording layer 314 may include FePt alloys or FePtX alloys.

The magnetic media 300 may have improved performance. The magnetic seed layer 310 and nonmagnetic interlayer 312 may provide the desired growth template to control the grain size, variation in grain size, crystal orientation dispersion and easy axis of the magnetic layer 314. Thus, the signal to noise ratio of the media 300 may be improved. Because the magnetic seed layer 310 is magnetic instead of nonmagnetic, coupling between the magnetic layer 314 and the soft underlayer structure 320 may be improved. Stated differently, the space between the magnetic layer 314 and a magnetic layer that is magnetically coupled with the soft underlayer structure 320 may be reduced over a media (102) in which a nonmagnetic seed layer 210 (see FIG. 2) is used in lieu of the magnetic seed layer 310 (see FIG. 3). The magnetic seed layer 310 may, therefore, function magnetically as part of the soft underlayer (bottom SUL 304 & top SUL 308) because the magnetic seed layer 310 is magnetically coupled with the top SUL 308 which is coupled to the bottom SUL 304. Thus, use of the magnetic seed layer 310 may improve writability. Furthermore, the use of a magnetic seed layer above the top SUL 308 allows for a thinner top SUL layer 308. The top SUL 308 may be decreased in thickness because this layer is magnetically coupled with the magnetic seed layer 310. Thus, the effective magnetic thickness of the soft underlayer structure 320 (bottom SUL 304 and top SUL 308) may be maintained or increased while decreasing/without increasing the physical thickness of the soft underlayer 320. In some embodiments, the total (effective) magnetic thickness of the top SUL 308 and magnetic seed layer 312 match the magnetic thickness of the bottom SUL 304. In some embodiments, the moments and/or permeability of the combination of the top SUL 308 and magnetic seed layer 312 match that of the bottom SUL 304. Thus, writability may be improved without significantly sacrificing track width. The distance between the top of the top SUL 308 and the magnetic head 106 used in conjunction with the media 300 may be decreased. In some cases, the decrease may be equal to the thickness of the magnetic seed layer 312. Performance of the magnetic recording media 300 at higher densities may be improved.

In exemplary embodiments the media 300 may include a capping layer 316 and a protective carbon overcoat layer 318. The capping layer 316 may help improve the magnetic performance of the recording layer 314. The carbon overcoat layer 318 is used to provide wear protection for the media 300. In alternative embodiments, an optional lubrication layer 319 may be placed on the COO to help the recording head 106 glide more easily on the media 300.

Figure 4:
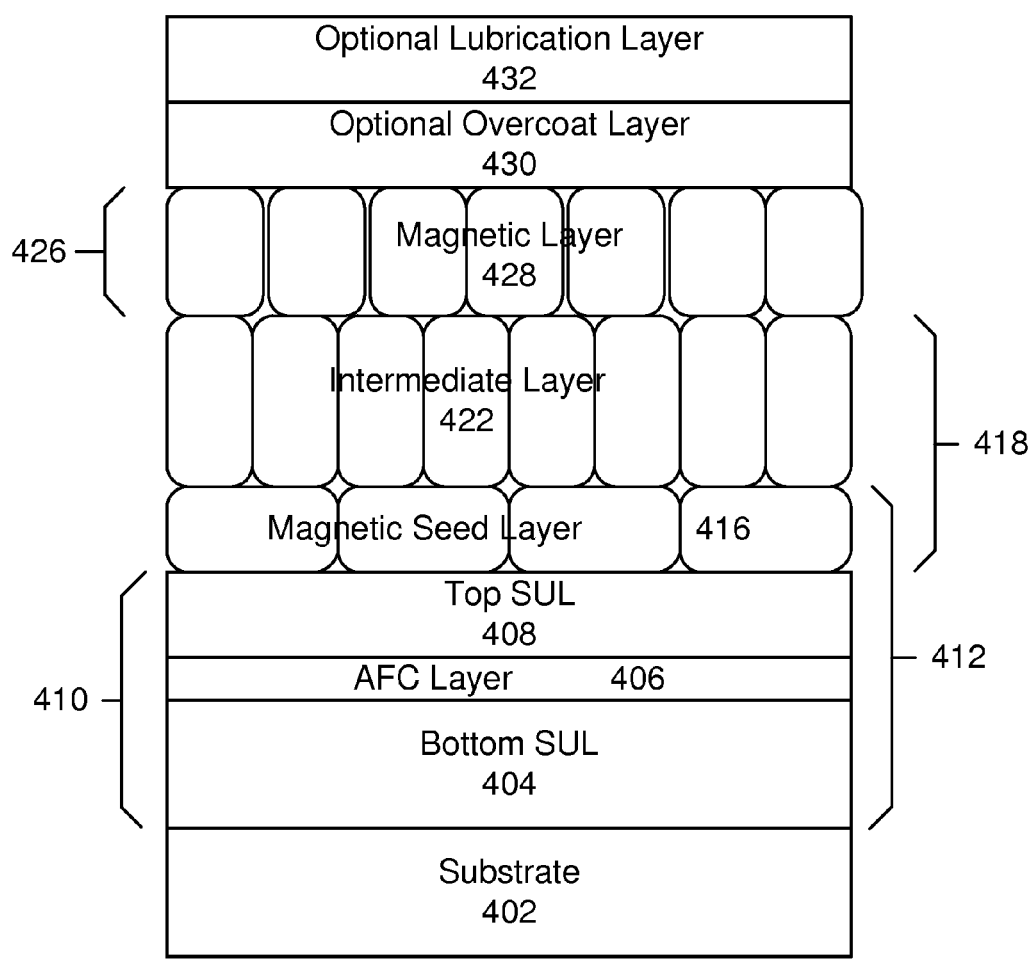
FIG. 4 depicts another view of the magnetic media with an unbalanced SUL and a magnetic seed layer according to an exemplary embodiment.

FIG. 4 depicts another view of the magnetic media with an unbalanced SUL and a magnetic seed layer according to an exemplary embodiment. The media depicted in FIG. 4 may be used in the disk drive of FIG. 1. For simplicity not all portions of the magnetic media 300 are shown. In addition, although the magnetic media 300 is depicted in the context of particular components other and/or different components may be used. A magnetic media 300 according to exemplary embodiments may be formed over a substrate made of aluminum alloy or glass 402. The media 300 may include a bottom SUL layer 404 deposited on the substrate. In exemplary embodiments, a top SUL layer 408 located above the bottom SUL layer 404, and separated by an antiferromagnetic coupling (AFC) layer 406 that couples the bottom 404 and top SUL 408 layers. In exemplary embodiments, the bottom SUL 404 thickness is greater than the thickness of the top SUL 408. In these embodiments, the SUL structure 410 is considered unbalanced because there is more magnetic material (bottom SUL 404) located below the AFC layer 406 than above the AFC layer (top SUL 408). Stated differently, the thicknesses and/or magnetic moments of the bottom SUL 404 and top SUL 408 layers may not be the same. In some embodiments the thickness of the top SUL 408 may be different than the thickness of the bottom SUL 404.

In exemplary embodiments, the media 300 includes a magnetic seed layer 416 located above the top SUL 408. The thickness of the magnetic seed layer 416 may be between 3 and 7 nanometers. The magnetic seed layer 410 has a crystal structure configured to facilitate growth of the magnetic recording layer 428. For example, the magnetic seed layer 416, along with nonmagnetic intermediate layer 422 may be used to promote the easy axis for the columnar grain growth as well as the grain size of the magnetic layer 428. In some embodiments, the intermediate layer 422 has a thickness of at least six and not more than fifteen nanometers. The magnetic seed layer 416 includes Ni alloyed with a non-magnetic material and with at least one other magnetic material, such as Fe and/or Co. For example, Ni alloyed with W or V and with Fe or Co may be used. In at least some embodiments, the magnetic seed layer 416 includes at least one of $NiW_xFe_y$, $NiW_xCo_y$, and $NiW_xCo_yAl_z$, where x may be at least three atomic percent and not more than seven atomic percent, y, and z may be at least fifteen atomic percent and not more than forty atomic percent. In alternative embodiments, $NiV_aCo_b$, $NiV_aCo_bAl_c$, $NiW_xV_aCo_b$, or $NiW_xV_aFe_b$ where x may be at least three atomic percent and not more than seven atomic percent, y may be at least fifteen atomic percent and not more than forty atomic percent, a may be between five to fifteen atomic percent, and b may be between fifteen to forty atomic percent, c may be between 0.5 and 2 atomic percent, and the remainder of the composition would consist of Nickel. In exemplary embodiments of $NiW_xV_aCo_y$, or $NiW_xV_aFe_b$ alloys, when x and a atomic are equal, the media performance is optimized.

In some embodiments, the media 300 may include an intermediate layer 422. As previously stated, the intermediate layer acts as a non-magnetic seed layer above the magnetic seed layer 416, and it helps promote the easy axis for the columnar grain growth as well as the grain size of the magnetic layer 428.

The magnetic recording layer 428 (also referred to as magnetic layer) 428 stores the magnetic bits used to store data on the magnetic media 300. In some embodiments, the magnetic recording layer 428 may include FePt alloys or FePtX alloys.

The magnetic media 300 may have improved performance. As depicted in the FIG. 4, the magnetic seed layer 416 and nonmagnetic interlayer 422 (shown as the seed layer structure 418) may provide the desired growth template to control the grain size (magnetic layer grains 426), variation in grain size, crystal orientation dispersion and easy axis of the magnetic layer 428. Thus, the signal to noise ratio of the media 300 may be improved. Because the magnetic seed layer 416 is magnetic instead of nonmagnetic, coupling between the magnetic layer 428 and the soft underlayer structure 410 may be improved. Stated differently, the space 418 between the magnetic layer 428 and the magnetic seed layer 416 that is magnetically coupled with the soft underlayer structure 410 may be reduced when compared to a conventional magnetic media structure (102) in which a nonmagnetic seed layer 210 (see FIG. 1) may be used in lieu of the magnetic seed layer 416 (see FIG. 4). The magnetic seed layer 410 may, therefore, function magnetically as part of the soft underlayer (bottom SUL 404 & top SUL 408) because the magnetic seed layer 416 is magnetically coupled with the top SUL 408 which is coupled to the bottom SUL 404 through the AFC layer 406. Thus, use of the magnetic seed layer 416 may improve writability. Furthermore, the use of a magnetic seed layer above the top SUL 408 allows for a thinner top SUL layer 408. In some embodiments, the total (effective) magnetic thickness of the top SUL 408 and magnetic seed layer 416 match the magnetic thickness of the bottom SUL 404. In some embodiments, the moments and/or permeability of the combination of the top SUL 408 and magnetic seed layer 416 match that of the bottom SUL 404. The top SUL 408 may be decreased in thickness because this layer is magnetically coupled with the magnetic seed layer 416. Thus, the effective magnetic thickness of the soft underlayer structure 410 may be maintained or increased without increasing or even decreasing the physical thickness of the soft underlayer structure 410. Thus, writability of the magnetic media 300 may be improved without significantly sacrificing track width. The distance between the top of the top SUL 408 and the magnetic head 106 used in conjunction with the media 400 may be decreased. In some cases, the decrease may be equal to the thickness of the magnetic seed layer 416. Performance of the magnetic recording media 300 at higher densities may also be improved. In exemplary embodiments the media 300 may include an optional capping layer (not shown), an optional overcoat layer 430, and an optional lubrication layer 432 that may reside on the overcoat layer.

Figure 2:
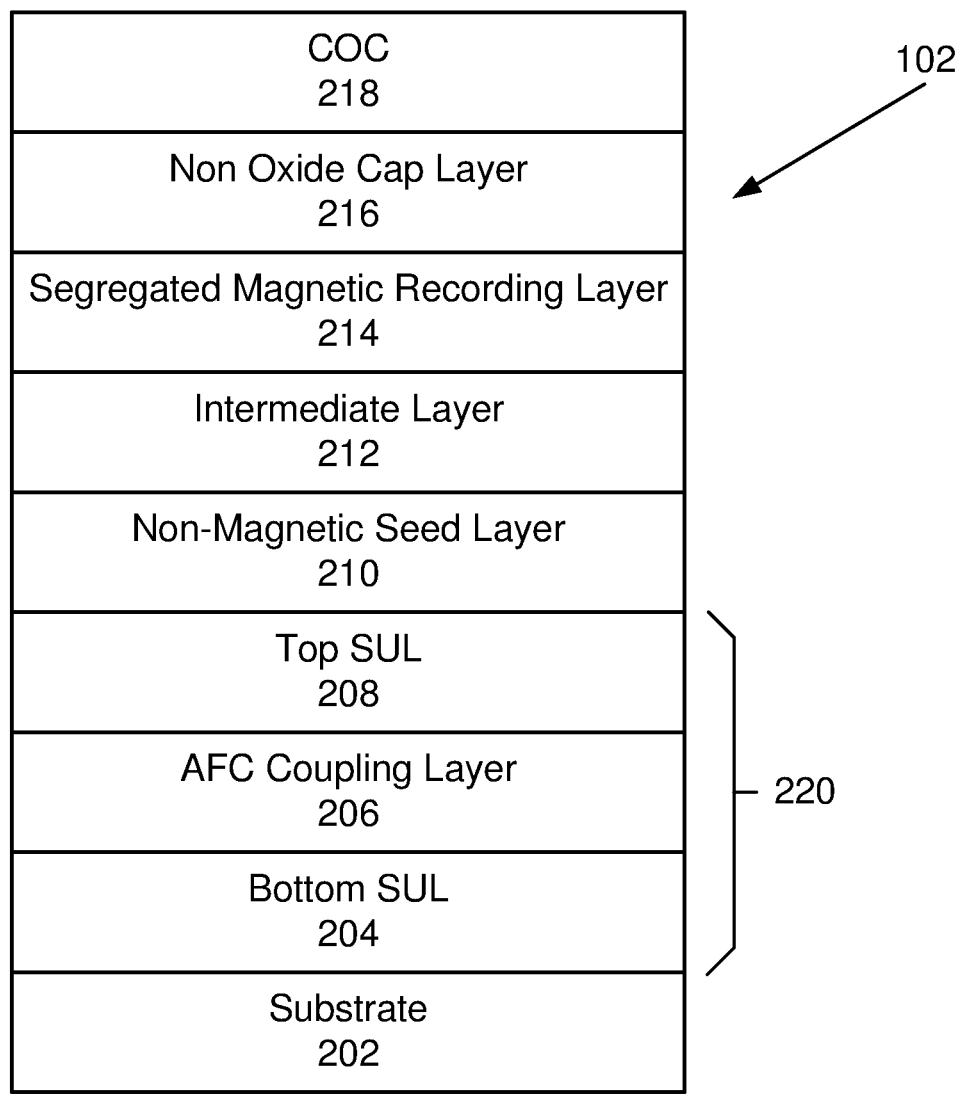
FIG. 2 depicts the structure of a conventional magnetic media with an unbalanced SUL and a non-magnetic seed layer.
Figure 5:
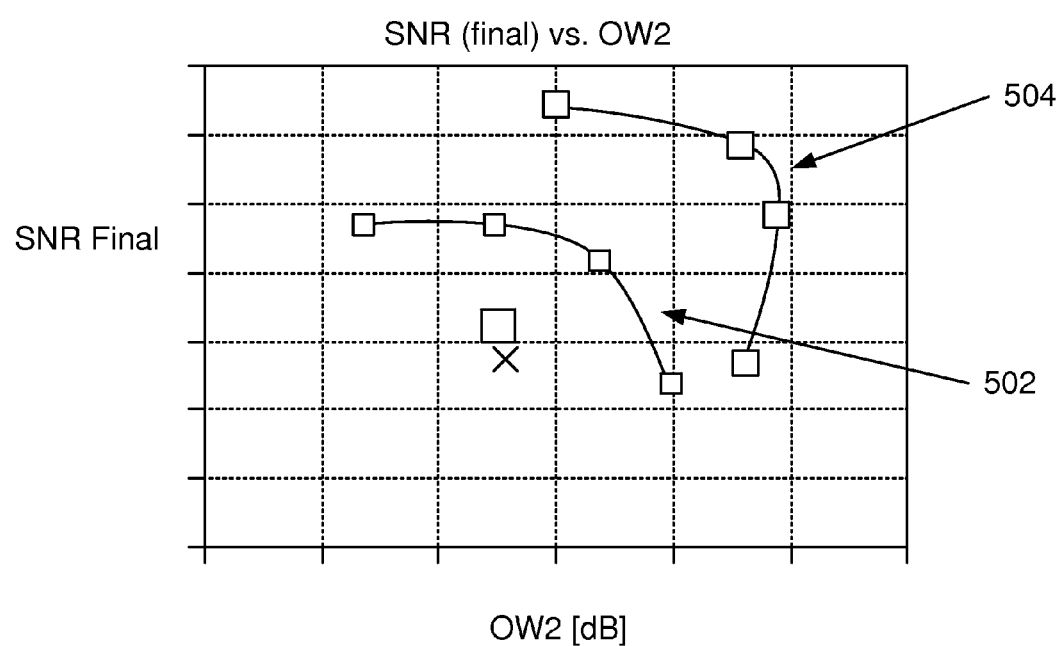
FIG. 5 illustrates the SNR and Overwrite properties of a magnetic media according to an exemplary embodiment.

FIG. 5 illustrates the SNR and Overwrite properties of a magnetic media according to an exemplary embodiment. As depicted in FIG. 5, both the signal to noise ratio (SNR) and the overwrite property of the magnetic media 300 may improve with the use of a magnetic seed layer 416 above the soft underlayer structure 410. This may be partially due to the fact that the use of a magnetic seed layer 416 allows for an underlayer structure 410 that is thinner than a conventional media where a non-magnetic seed layer was used, as shown in FIG. 2. The curve 502 shows the SNR vs. overwrite signal for a recording media with a non-magnetic seed layer as shown in FIG. 2. The curve 504 shows the SNR vs. overwrite signal for one embodiment of a recording media with a magnetic seed layer as depicted in FIG. 3. Other embodiments may have different curves. Additionally, a more uniform and columnar growth of the magnetic grains of the recording layer 428 promoted by the use of the magnetic seed layer 416 and intermediate layer 422 provides for a lower SNR value for the magnetic media 300. Furthermore, the overwrite property of the magnetic media 300 may be improved over the conventional media 102 without a magnetic seed layer 416. Overwrite for the magnetic media is determined by measuring multiple signal read backs from the recording media 300 after multiple writings and rewritings. In some embodiments, hundreds of writing, erasing, rewriting and reading operations are performed to calculate the overwrite value for the magnetic media 300. In some embodiments, an overwrite (OW) of the 300 media is in the range of 25-45 db.

Figure 6:
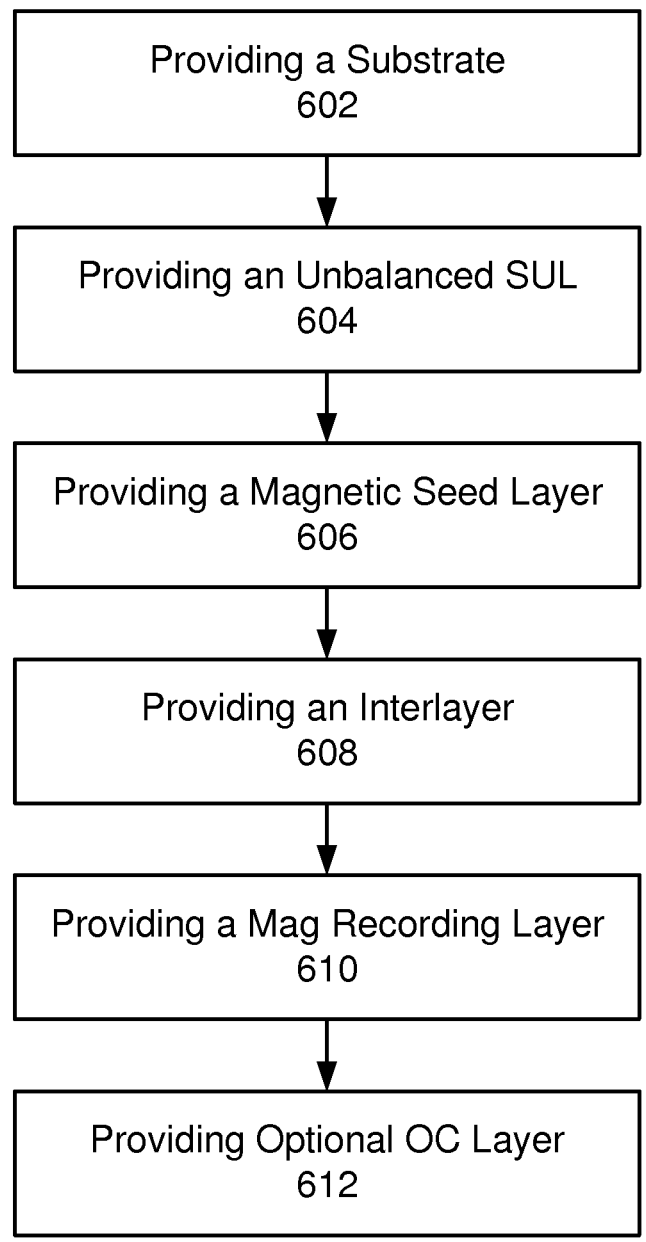
FIG. 6 illustrates a method of making a a magnetic media according to an exemplary embodiment.

FIG. 6 illustrates a method of making a magnetic media according to an exemplary embodiment. In exemplary embodiments, in operation 602, a media substrate is provided. In some embodiments, the substrate may be glass. In other embodiments the substrate may be made of aluminum alloys.

In operation 604, a first unbalanced SUL is provided on the substrate. As previously described, the unbalanced SUL may comprise of a thicker bottom SUL layer antiferromagnetically coupled to a thinner top SUL layer though an AFC layer.

In operation 606, a magnetic seed layer is provided on the SUL layer. The magnetic seed layer may couple to the unbalanced SUL. In some embodiments, the magnetic seed layer may be designed to magnetically balance the SUL.

In operation 608, an interlayer or a non-magnetic seed layer may be provided. The magnetic seed layer and the non-magnetic interlayer may help promote a desired growth template to control the grain size, variation in grain size, crystal orientation dispersion and easy axis of a magnetic recording layer. Thus, the signal to noise ratio of the media 300 may be improved.

In operation 610, a magnetic recording layer may be provided. The magnetic recording layer may include FePt alloys or FePtX alloys.

In operation 612, an optional capping layer, carbon overcoat protective layer and lubrication layer may also be provided.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. The drawings are not necessarily to scale. "Comprising," "including," and "having," are intended to be open-ended terms.

We claim:

1. A magnetic media comprising:
   a substrate;
   an unbalanced soft under layer (SUL) including a top SUL;
   a magnetic seed layer consisting of a material selected from a first alloy and a second alloy, the first alloy including at least one of $NiV_aCo_b$, $NiV_aCo_bAl_c$, $NiW_xV_aCo_b$ and $NiW_xV_aFe_b$, the second alloy including at least one of $NiW_xFe_y$, $NiW_xCo_y$ and $NiW_xCo_yAl_z$, where x is between 3 and 7 atomic percent, y and z are between 15 and 40 atomic percent, a is between 5 and 15 atomic percent, b is between 15 to 40 atomic percent, and c is between 0.5 to 2 atomic percent; and
a magnetic recording layer.

2. The magnetic media of claim 1 wherein the thickness of the magnetic seed layer is between 3 to 7 nanometers.

3. The magnetic media of claim 2 wherein the spacing between a top of the SUL and a magnetic head is lessened by the thickness of the seed layer.

4. The magnetic media of claim 1 wherein the unbalanced SUL further comprises:
a bottom SUL separated from the top SUL by an antiferromagnetic coupling (AFC) layer.

5. The magnetic media of claim 4 wherein the top SUL and the magnetic seed layer are antiferromagnetically coupled with the bottom SUL.

6. The magnetic media of claim 4 wherein the AFC layer is ruthenium or Ru alloy.

7. The magnetic media of claim 4 wherein a magnetic thickness and a first moment of the bottom SUL matches a total magnetic thickness and a second moment of the top SUL and the seed layer.

8. The magnetic media of claim 1 wherein an overwrite (OW) of the magnetic media is in the range of 25-45 db.

9. The magnetic media of claim 1 further comprising:
an intermediate layer overlying the seed layer is a Ru or Ru alloy and has a thickness of at least six nanometers and not more than fifteen nanometers;
a cap layer overlying the magnetic recording layer;
a carbon overcoat layer on the cap layer; and
a lubrication layer on the overcoat layer.

10. The magnetic media of claim 9 wherein the thickness of the seed layer is between 3 to 7 nanometer.

11. A disk drive comprising:
a slider including a magnetic head for reading and writing to a magnetic media;
the magnetic media comprising:
a substrate;
an unbalanced soft under layer (SUL) including a top SUL;
a magnetic seed layer consisting of a material selected from a first alloy and a second alloy, the first alloy including at least one of $NiV_aCo_b$, $NiV_aCo_bAl_c$, $NiW_xV_aCo_b$ and $NiW_xV_aFe_b$, the second alloy including at least one of $NiW_xFe_y$, $NiW_xCo_y$ and $NiW_xCo_yAl_z$, where x is between 3 and 7 atomic percent, y and z are between 15 and 40 atomic percent, a is between 5 and 15 atomic percent, b is between 15 to 40 atomic percent, and c is between 0.5 to 2 atomic percent; and
a magnetic recording layer.

12. The disk drive of claim 11 wherein the unbalanced SUL further comprises:
a bottom SUL separated from the top SUL by an antiferromagnetic coupling (AFC) layer.

13. The disk drive of claim 12 wherein a magnetic thickness and a first permeability of the bottom SUL matches a total magnetic thickness and a second permeability of the top SUL and the seed layer.

14. The disk drive of claim 12 wherein a spacing between the top of the top SUL and a magnetic head is lessened by the thickness of the magnetic seed layer.

15. The disk drive of claim 11 wherein an overwrite (OW) of the magnetic media is in the range of 25-45 db.

16. The disk drive of claim 11 further comprising:
an intermediate layer overlying the magnetic seed layer;
a cap layer overlying the magnetic recording layer;
a carbon overcoat layer on the cap layer; and
a lubrication layer on the carbon overcoat layer.

17. A method for providing a magnetic media having an unbalanced Soft Under Layer (SUL) comprising:
providing a substrate;
providing an unbalanced soft under layer (SUL);
providing a magnetic seed layer consisting of a material selected from a first alloy and a second alloy, the first alloy including at least one of $NiV_aCo_b$, $NiV_aCo_bAl_c$, $NiW_xV_aCo_b$ and $NiW_xV_aFe_b$, the second alloy including at least one of $NiW_xFe_y$, $NiW_xCo_y$ and $NiW_xCo_yAl_z$, where x is between 3 and 7 atomic percent, y and z are between 15 and 40 atomic percent, a is between 5 and 15 atomic percent, b is between 15 to 40 atomic percent, and c is between 0.5 to 2 atomic percent; and
providing a magnetic recording layer.

18. The method of claim 17 wherein the unbalanced SUL further comprises:
of a bottom SUL separated from a top SUL by an antiferromagnetic coupling (AFC) layer.

19. The method of claim 18 further comprising:
matching the magnetic thickness of the bottom SUL to that of the total magnetic thickness of the top SUL and the seed layer by adjusting a physical thickness of the top SUL or the magnetic seed layer.

* * * * *